(12) United States Patent
Shi et al.

(10) Patent No.: US 12,480,977 B2
(45) Date of Patent: Nov. 25, 2025

(54) ELECTRICAL SIGNAL SAMPLING DEVICE

(71) Applicant: RIGOL TECHNOLOGIES CO., LTD., Jiangsu (CN)

(72) Inventors: Hui Shi, Jiangsu (CN); Yue Wang, Jiangsu (CN)

(73) Assignee: RIGOL TECHNOLOGIES CO., LTD., Jiangsu (CN)

( * ) Notice: Subject to any disclaimer, the term of this patent is extended or adjusted under 35 U.S.C. 154(b) by 167 days.

(21) Appl. No.: 18/278,459

(22) PCT Filed: Feb. 23, 2022

(86) PCT No.: PCT/CN2022/077435
§ 371 (c)(1),
(2) Date: Aug. 23, 2023

(87) PCT Pub. No.: WO2022/179521
PCT Pub. Date: Sep. 1, 2022

(65) Prior Publication Data
US 2024/0133922 A1   Apr. 25, 2024
US 2024/0230719 A9   Jul. 11, 2024

(30) Foreign Application Priority Data
Feb. 24, 2021   (CN) .......................... 202110210035.8

(51) Int. Cl.
*G01R 13/02* (2006.01)
(52) U.S. Cl.
CPC ................. *G01R 13/0272* (2013.01)
(58) Field of Classification Search
CPC ............... G01R 13/0272; G01R 31/11; G01R 31/2806; G01R 13/0218; G01R 13/0254
See application file for complete search history.

(56) References Cited

U.S. PATENT DOCUMENTS

| 4,732,469 A |   | 3/1988 | Souma |
| 5,521,512 A | * | 5/1996 | Hulina ................... G01R 31/11 |
|  |  |  | 324/76.38 |

(Continued)

FOREIGN PATENT DOCUMENTS

| CN | 201654786 U | 11/2010 |
| CN | 102147460 A | 8/2011 |

(Continued)

OTHER PUBLICATIONS

International Search Report issued in International Application No. PCT/CN2022/077435 dated May 24, 2022, English Translation.

(Continued)

*Primary Examiner* — Neel D Shah
*Assistant Examiner* — Adam S Clarke
(74) *Attorney, Agent, or Firm* — George Likourezos; Carter, DeLuca & Farrell LLP

(57) ABSTRACT

Provided is an electrical signal sampling device. The electrical signal sampling device includes a pulse signal source, a first sampling module, and a signal delay module. The pulse signal source is configured to generate a pulse signal. The first sampling module is connected to the pulse signal source through a coupler. The coupler is configured to fan-out the pulse signal to generate a test input signal and a sampling incidence signal. The test input signal is input into a tested device from the coupler and then is coupled to form a test output signal. The first sampling module is configured to collect the sampling incidence signal and the test output signal through the coupler. The signal delay module generates N excitation signals through a preset delay.

9 Claims, 8 Drawing Sheets

(56) References Cited

U.S. PATENT DOCUMENTS

| | | |
|---|---|---|
| 5,554,949 A | 9/1996 | Suwald |
| 6,121,799 A | 9/2000 | Moser |
| 6,124,717 A * | 9/2000 | Guenther, Jr. .......... G01R 31/11 |
| | | 324/642 |
| 2004/0151210 A1 | 8/2004 | Wilson et al. |
| 2007/0120723 A1 | 5/2007 | Watanabe |
| 2008/0183409 A1 | 7/2008 | Roberts |
| 2011/0187381 A1* | 8/2011 | Ems ....................... G01R 31/11 |
| | | 324/533 |
| 2013/0106399 A1* | 5/2013 | Gohel .................. G01R 35/005 |
| | | 324/76.77 |
| 2013/0207641 A1* | 8/2013 | Timm ................ G01R 13/0272 |
| | | 324/121 R |
| 2017/0005640 A1 | 1/2017 | Hidru |
| 2019/0302183 A1 | 10/2019 | Peschke |

FOREIGN PATENT DOCUMENTS

| | | |
|---|---|---|
| CN | 102466748 A | 5/2012 |
| CN | 202385068 U | 8/2012 |
| CN | 103323215 A | 9/2013 |
| CN | 104220919 A | 12/2014 |
| CN | 108267628 A | 7/2018 |
| CN | 208422419 U | 1/2019 |
| CN | 109946588 A | 6/2019 |
| CN | 110350892 A | 10/2019 |
| CN | 212254401 U | 12/2020 |
| CN | 113009201 A | 6/2021 |
| EP | 0943925 A2 | 9/1999 |
| GB | 2126857 A | 3/1984 |
| JP | 2009204443 A | 9/2009 |
| JP | 2009544242 A | 12/2009 |
| JP | 2012083342 A | 4/2012 |
| JP | 2016024197 A | 2/2016 |

OTHER PUBLICATIONS

1st Chinese Office Action issued in corresponding CN Patent Application No. 202110210035.8 dated Feb. 17, 2022, English Translation.

European Search Report issued by the European Patent Office in connection with International Application No. 22758885.2, dated Nov. 6, 2024.

Japanese Office Action issued by Japanese Patent Office in connection with International Application No. 2023-542992, dated Dec. 5, 2023.

Japanese Office Action issued by the Japanese Patent Office in connection with International Application No. 2023-542992, dated Feb. 20, 2024.

CD-ROM of Japanese Utility Model Application No. 04-003327 (JP H05-063128U), issued by the Japanese Patent Office, pp. 1-10, 1993.

* cited by examiner

ELECTRICAL SIGNAL SAMPLING DEVICE

CROSS-REFERENCE TO RELATED APPLICATIONS

The present application is a National Stage Application filed under 35 U.S.C. 371 based on International Patent Application No. PCT/CN2022/077435, filed on Feb. 23, 2022, which claims priority to Chinese Patent Application No. 202110210035.8 filed on Feb. 24, 2021, the disclosures of both of which are incorporated herein by reference in their entireties.

TECHNICAL FIELD

Embodiments of the present application relate to the field of electronic circuit technology, for example, an electrical signal sampling device.

BACKGROUND

Time domain reflectometry (TDR) and time domain transmission (TDT) are widely used in scenarios like signal integrity analysis, cable testing, and printed circuit board (PCB) testing. The most commonly used TDR test devices are sampling oscilloscopes. A sampling oscilloscope may implement a high sampling oscilloscope through a low sampling rate. However, the sampling oscilloscope is generally costly and can be only configured to test repeated signals.

A real-time oscilloscope may test a tested signal in real-time. The arrangement in which the TDR function or the TDT function is integrated into the real-time oscilloscope can effectively reduce the cost of TDR or the cost of TDT. Time resolution is an important indicator of TDR. Frequency resolution is an important indicator of TDT. Factors that affect the two indicators are a bandwidth (BW) of the oscilloscope and the rising time Tr of a pulse signal source. The larger the Bandwidth BW and the smaller the rising time Tr, the higher the time resolution of TDR. Moreover, TDT is the frequency domain transformation of TDR. In this case, the higher the time resolution of TDR, the higher the frequency resolution of TDT.

Conventional methods of improving the time resolution of TDR/the frequency resolution of TDT include increasing a bandwidth and reducing the signal rising time of a pulse signal source. For a bandwidth improvement method, when an analog bandwidth of the real-time oscilloscope reaches 10 GHz, the rising time of a fast edge to which the real-time oscilloscope can respond is that $T_R=35$ picoseconds (ps). The time during which a signal transmits to the tested device and is reflected back to a transmission point is 2T. In this case, $2T<T_R$, and T<17.5 ps. That is, the analog bandwidth of the real-time oscilloscope is increased to 10 GHz. The time resolution of TDR can reach 17.5 ps. For a method of reducing the rising time of a pulse source signal, the rising time of the fastest edge is 35 ps currently. From Formula (1) showing the relationship among the rising time $T_{test}$ of a fast edge tested by the real-time oscilloscope, the rising time $T_S$ of the pulse source signal, and the rising time $T_{scope}$ of the fast edge to which the oscilloscope can respond, an improvement in the edge speed of the pulse source signal can effectively improve the time resolution of TDR and the frequency resolution of TDT only when the rising time $T_S$ of the pulse source signal is far less than the rising time $T_{scope}$ of the fast edge to which the oscilloscope can respond. However, it is more difficult to design a pulse width signal far less than 35 ps.

$$T_{test}=\sqrt{T_S^2+T_{scope}^2)} \qquad \text{Formula (1)}$$

Above all, each method in the related art and of improving the time resolution or frequency resolution of the real-time oscilloscope integrated with the TDR function or the TDT function has a high implementation cost and is complicated to implement.

SUMMARY

Embodiments of the present application provide an electrical signal sampling device so as to implement the effect of an equivalent sampling oscilloscope, to increase a sampling bandwidth, and to improve the time resolution.

Embodiments of the present application provide an electrical signal sampling device. The electrical signal sampling device includes a pulse signal source, a first sampling module, and a signal delay module.

The pulse signal source is configured to generate a pulse signal.

The first sampling module is connected to the pulse signal source through a coupler. The coupler is configured to fan-out the pulse signal to generate a test input signal and a sampling incidence signal. The test input signal is input into a tested device from the coupler and then is coupled to form a test output signal. The first sampling module is configured to collect the sampling incidence signal and the test output signal through the coupler.

The signal delay module generates N excitation signals through a preset delay. The N excitation signals are used for controlling the pulse signal source to generate N groups of pulse signals in one period of the pulse signal. Alternatively, the N excitation signals are used for controlling the first sampling module to generate N groups of sampling incidence signal in one period of the sampling incidence signal. N is an integer greater than 1.

DETAILED DESCRIPTION

Figure 1:
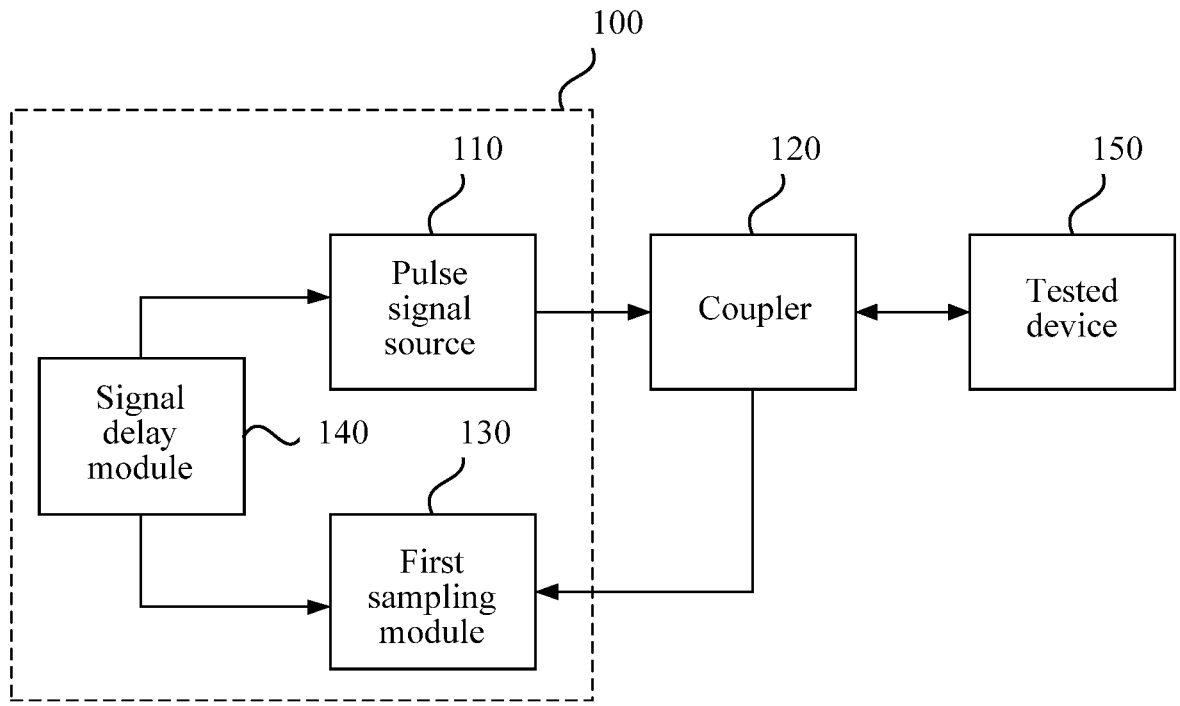
FIG. 1 is a structural diagram of an electrical signal sampling device according to an embodiment of the present application.

Specific embodiments of the present application will be described in detail hereinafter in conjunction with drawings.

It is to be noted that for ease of description, only part, not all, of the content related to the present application is illustrated in the drawings. Before exemplary embodiments are discussed in more detail, it is to be noted that some of the exemplary embodiments are described as processing or methods depicted in flowcharts. Although the flowcharts describe operations (steps) as sequential processing, many of the operations may be performed in parallel, coincidently, or simultaneously. Additionally, the sequence of the operations may be rearranged. The processing may be terminated when the operations are completed, but the processing may further have additional steps that are not included in the drawings. The processing may correspond to a method, a function, a procedure, a subroutine, a subprogram, or the like.

FIG. 1 is a structural diagram of an electrical signal sampling device according to embodiment one of the present application. This embodiment is applicable to the case of improving the time resolution or frequency resolution of a real-time oscilloscope integrated with the TDR function or the TDT function.

The structure of the electrical signal sampling device 100 includes a pulse signal source 110, a first sampling module 130, and a signal delay module 140.

The pulse signal source 110 is configured to generate a pulse signal.

The first sampling module 130 is connected to the pulse signal source 110 through a coupler 120. The coupler 120 is configured to fan-out the pulse signal to generate a test input signal and a sampling incidence signal. The test input signal is input into a tested device 150 from the coupler 120 and then is coupled to form a test output signal. The first sampling module 130 is configured to collect the sampling incidence signal and the test output signal through the coupler 120.

The signal delay module 140 generates N excitation signals through a preset delay. The N excitation signals are used for controlling the pulse signal source 110 to generate N groups of pulse signals in one period of the pulse signal. Alternatively, the N excitation signals are used for controlling the first sampling module to generate N groups of sampling incidence signals in one period of the sampling incidence signal. N is an integer greater than 1.

The pulse signal source 110 serves as an incidence signal source of the electrical signal sampling device 100 and is configured to generate the pulse signal. The pulse signal has a fast rising edge. That is, the edge rising time of the signal is very short. Exemplarily, the edge rising time of the pulse signal is about 35 picoseconds.

Optionally, the pulse signal source 110 may be a high-speed pulse source implemented by using a comparator or a shaping circuit.

With continued reference to FIG. 1, the coupler 120 may be placed outside the electrical signal sampling device 100. After the coupler 120 divides the pulse signal into two parts and fans out the pulse signal, one part serves as the test input signal of the tested device 150, and the other part serves as the sampling incidence signal to be connected to the first sampling module 130.

It is to be understood that in the preceding embodiment, the coupler 120 is placed outside the electrical signal sampling device 100. In this case, the transmission of each signal is completed through an interaction between the electrical signal sampling device 100 and the external coupler 120.

Figure 2:
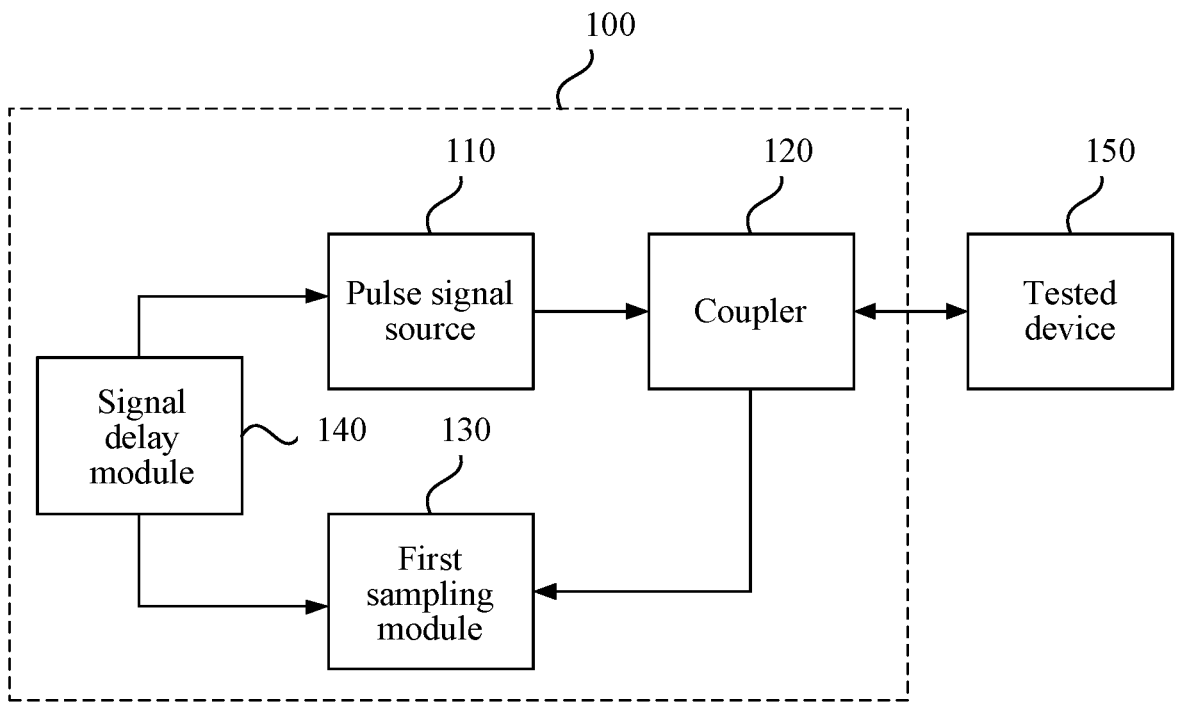
FIG. 2 is a structural diagram of another electrical signal sampling device according to an embodiment of the present application.

FIG. 2 is a structural diagram of an electrical signal sampling device according to an embodiment of the present application. Referring to FIG. 2, the coupler 120 is placed inside the electrical signal sampling device 100. In this case, the transmission of each signal is completed inside the electrical signal sampling device 100.

It is to be understood that when the coupler is placed inside the electrical signal sampling device 100, a sampling channel of the electrical signal sampling device 100 needs to be switched. Alternatively, the electrical signal sampling device 100 needs to be fixed as a time domain reflectometry (TDR) measuring instrument. In this case, the TDR/TDT function of the electrical signal sampling device 100 provided in embodiments of the present application fails to be implemented. Moreover, the operation is relatively troublesome. In comparison, the arrangement in which the coupler is placed outside the electrical signal sampling device 100 is more flexible.

On the basis of the preceding embodiments, the coupler 120 may be one of a power divider, a directional coupler, a standing wave ratio bridge, or an operational amplifier.

The first sampling module 130 is an analog signal sampling channel of the electrical signal sampling device 100. The first sampling module 130 is configured to collect the sampling incidence signal of the pulse signal source 110 and the test output signal of the tested device 150.

It is to be understood that the first sampling module 130 is configured to display a signal waveform, obtained by superimposing the sampling incidence signal and the test output signal, on a time domain display so that those skilled in the art can analyze the collected waveform signal at the same time. The sampling of the first sampling module 130 is in the control of the electrical signal sampling device 100 and is implemented according to the sample-clock phase relationship of the signal delay module 140.

The signal delay module 140 generates the N excitation signals through the preset delay. The N excitation signals are used for the control of the pulse signal source 110; that is, the N excitation signals are used for controlling the pulse signal source 110 to generate N groups of pulse signals in one period of the pulse signal. Alternatively, the N excitation signals are used for the control of the first sampling module 130; that is, the N excitation signals are used for controlling the first sampling module 130 to generate the N groups of sampling incidence signals in one period of the sampling incidence signal. By generating the N excitation signals through the preset delay, the signal delay module 140 implements the effect of an equivalent sampling oscilloscope, thereby improving the time resolution of TDR measurement or the frequency resolution of TDT measurement.

It is to be noted that the electrical signal sampling device 100 may be a real-time oscilloscope on the basis of the preceding embodiments. The tested device 150 may be a component requiring an impedance test, for example, a circuit board, which is not limited in this embodiment.

For technical solutions of embodiments of the present application, the electrical signal sampling device 100 includes a pulse signal source 110, a first sampling module 130, and a signal delay module 140. The pulse signal source 110 is configured to generate a pulse signal. The first sampling module 130 is connected to the pulse signal source 110 through a coupler 120. The coupler 120 is configured to fan-out the pulse signal to generate a test input signal and a sampling incidence signal. The test input signal is input into a tested device 150 from the coupler 120 and then is coupled to form a test output signal. Then the test output signal is transmitted from the tested device 150 to the coupler 120. The first sampling module 130 is configured to collect the sampling incidence signal and the test output signal through the coupler 120. The signal delay module 140 generates N excitation signals through a preset delay. The N excitation signals are used for controlling the pulse signal source 110 to generate N groups of pulse signals in one period of the pulse signal. Alternatively, the N excitation signals are used for controlling the first sampling module 130 to generate N groups of sampling incidence signals in one period of the sampling incidence signal. N is an integer greater than 1. This arrangement solves the problem in the related art that an improvement in the time resolution of TDR depends on technical improvement, thereby implementing the effect of an equivalent sampling oscilloscope, increasing a sampling bandwidth, and improving the time resolution.

Figure 3:
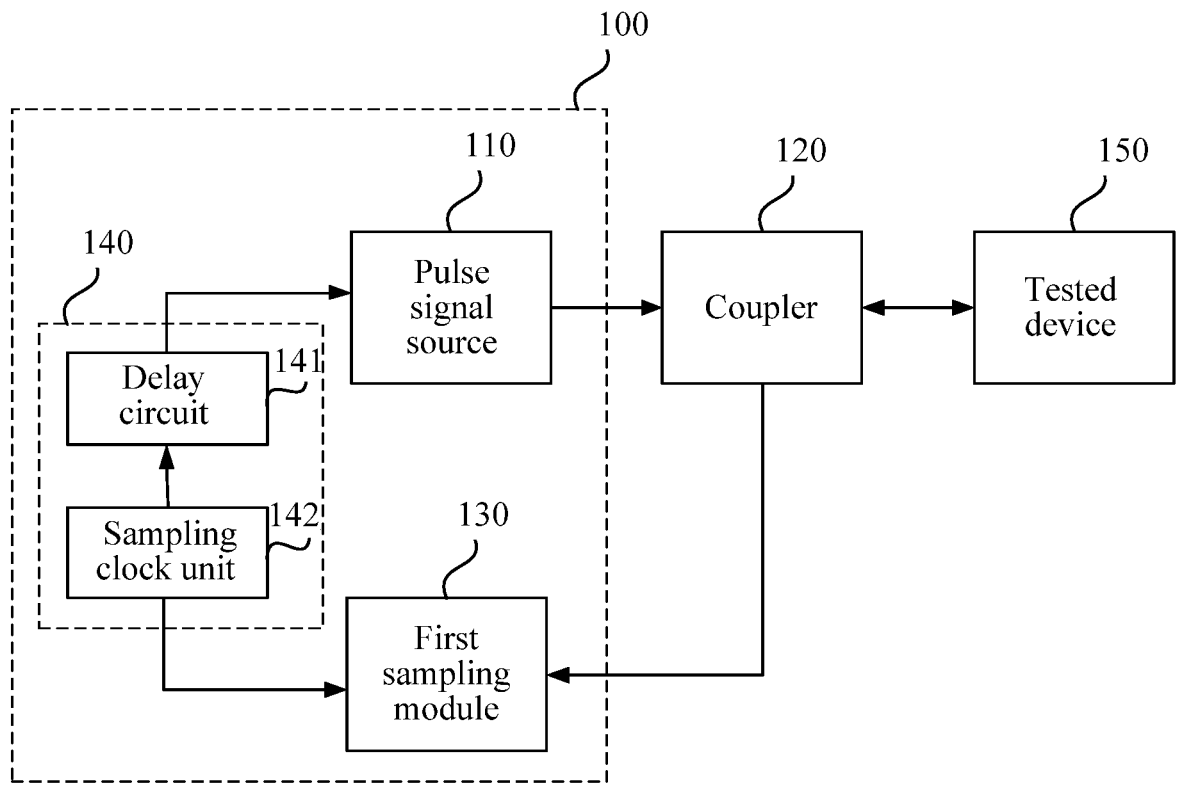
FIG. 3 is a structural diagram of another electrical signal sampling device according to an embodiment of the present application.

FIG. 3 is a structural diagram of an electrical signal sampling device according to an embodiment of the present application. Referring to FIG. 3, on the basis of the preceding embodiments, the signal delay module 140 includes a sampling clock unit 142 and a delay circuit 141.

The sampling clock unit 142 is configured to generate a sampling clock signal.

The delay circuit 141 is configured to generate the N excitation signals from the sampling clock unit through the preset delay.

With continued reference to FIG. 3, on the basis of the preceding embodiments, the pulse signal source 110 is connected to the delay circuit 141. The delay circuit 141 is connected to the sampling clock unit 142. The sampling clock unit 142 is connected to the first sampling module 130.

The sampling clock unit 142 is configured to provide a clock source for the pulse signal source 110 of the electrical signal sampling device 100 and the first sampling module 130 of the electrical signal sampling device 100; that is, the sampling clock unit 142 is configured to generate the sampling clock signal. Moreover, the sampling clock unit 142 guarantees that the pulse signal source 110 and the first sampling module 130 have a fixed phase relationship or connection relationship so that the frequency and phase of the pulse signal generated by the pulse signal source 110 are synchronized with the frequency and phase of the sampling clock signal.

It is to be understood that the sampling clock unit 142 generates two clock signals with the same delay, phase, and amplitude. That is, two sampling clock signals with the same delay, phase, and amplitude are output to the delay circuit 141 and the first sampling module 130 respectively.

Exemplarily, the sampling clock unit 142 may use a phase-locked loop circuit or a module that can synchronously output two synchronous clock sources in another related solution. Implementation manners of the sampling clock unit 142 are not limited in this embodiment.

The delay circuit 141 is configured to delay the sampling clock signals by a determined $\Delta t$. That is the preset delay generates a plurality of excitation signals sequentially delayed by $\Delta t$ so that the excitation signals and the sampling clock signals become high-speed pulse signals having a certain phase relationship.

It is to be understood that different implementation manners of the delay circuit 141 determine different magnitudes of the time resolution increased by the delay circuit 141.

With continued reference to FIG. 3, on the basis of the preceding embodiments, the delay circuit 141 may be one of a carry chain, a delay chip, a delay unit of a field-programmable gate array (FPGA), or a phase shifter.

Exemplarily, the delay circuit 141 may perform a delay through an RC circuit. That is, different delays are implemented through the adjustment of a resistor R or the adjustment of a capacitor C. Further, a delay at a 100-femtosecond (fs) level may be implemented. The delay circuit 141 may also be implemented through a delay chip. A delay chip in the related art may implement a delay with a minimum step of 2 ps. The delay circuit 141 may also be implemented by using a delay unit of an FPGA. The minimum delay step of the delay unit is 30 ps. The delay circuit 141 may also implement a delay by using a carry chain. The minimum delay that may be implemented by the carry chain is 10 ps. The delay circuit 141 may also be implemented by using a phase shifter. On the basis of the preceding embodiments, different implementation manners of the delay circuit 141 correspond to different delay time. In this case, equivalent sampling rates that can be improved are different, and the improved time resolution of TDR and the improved frequency resolution of TDT are different. Implementation manners of the delay circuit 141 are not limited in this embodiment.

Exemplarily, the delay circuit 141 is implemented by using a carry chain. The carry chain is a unit for implementing a fast operation in an FPGA. A delay implemented by the carry chain is very small and generally reaches about 10 ps. That is, an input step signal may be delayed by about 10 ps after passing through carry chain 1. Accordingly, carry chains may be cascaded to implement a greater delay.

Figure 4:
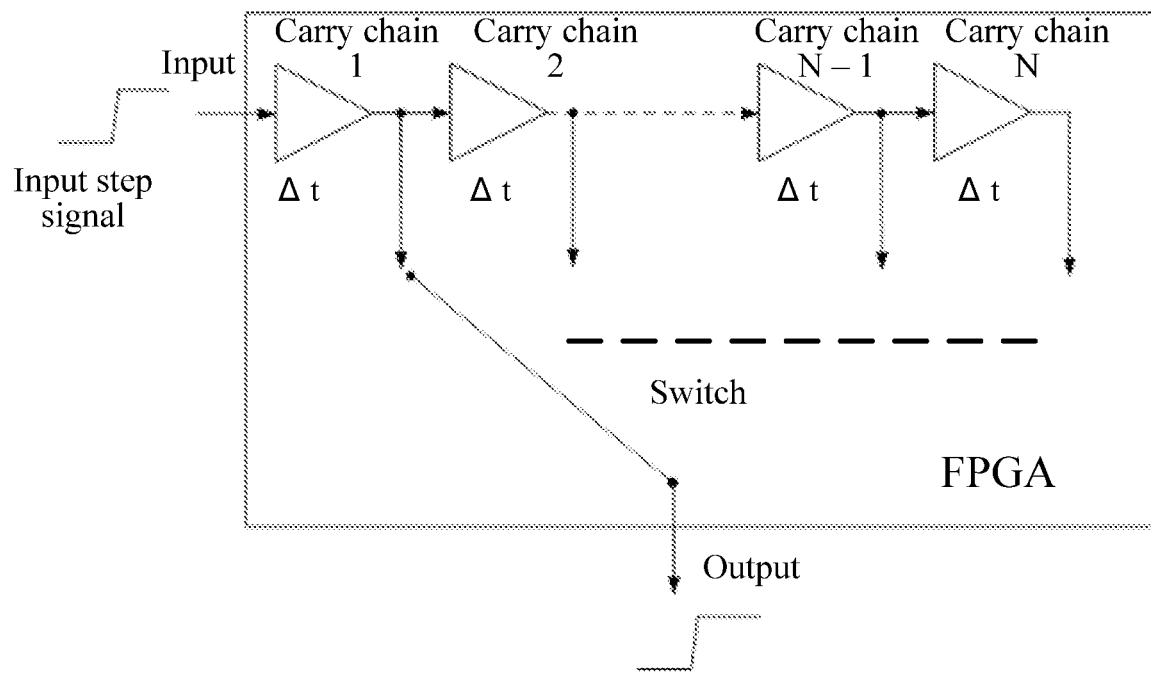
FIG. 4 is a structural diagram of a delay circuit implementing a delay by using a carry chain manner according to an embodiment of the present application.

FIG. 4 is a structural diagram of a delay circuit implementing a delay by using a carry chain manner according to an embodiment of the present application. Referring to FIG. 4, one FPGA element includes a total of N carry chains, that is, carry chain 1, carry chain 2, . . . , and carry chain N. The output of each carry chain may be connected to an output end of the FPGA device through a tap. Various taps correspond to different delays. All the taps may be selected by using a switch so that different delay outputs are selected. In this case, when one step signal is input and passes through delay outputs of the shown carry chains, the output of each carry chain is delayed by $\Delta t$ sequentially. The magnitude of $\Delta t$ is determined by the FPGA device. Different tags are selected through the switch, thereby implementing the fine delay adjustment of the input step signal.

Figure 5:
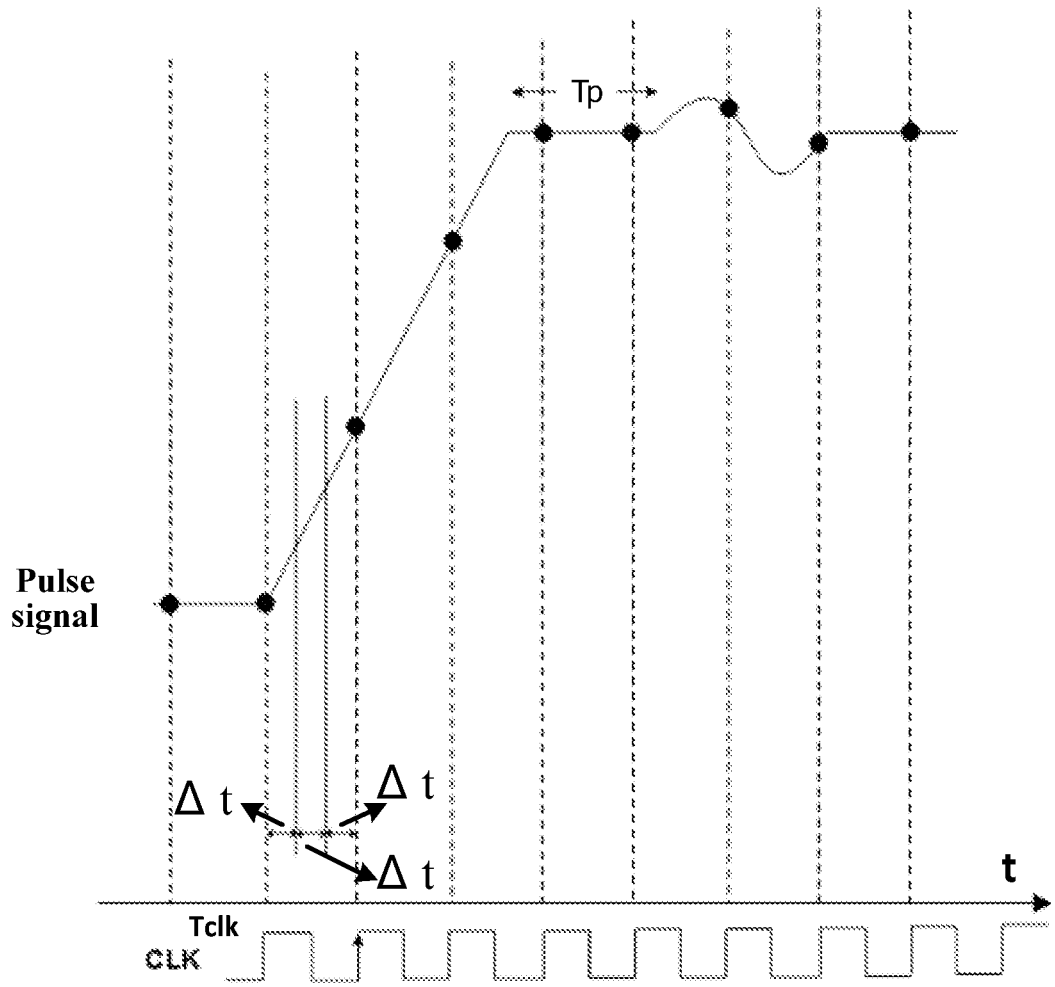
FIGS. 5 to 8 are waveform diagrams of the delay sampling of an electrical signal sampling device according to an embodiment of the present application.
Figure 6:
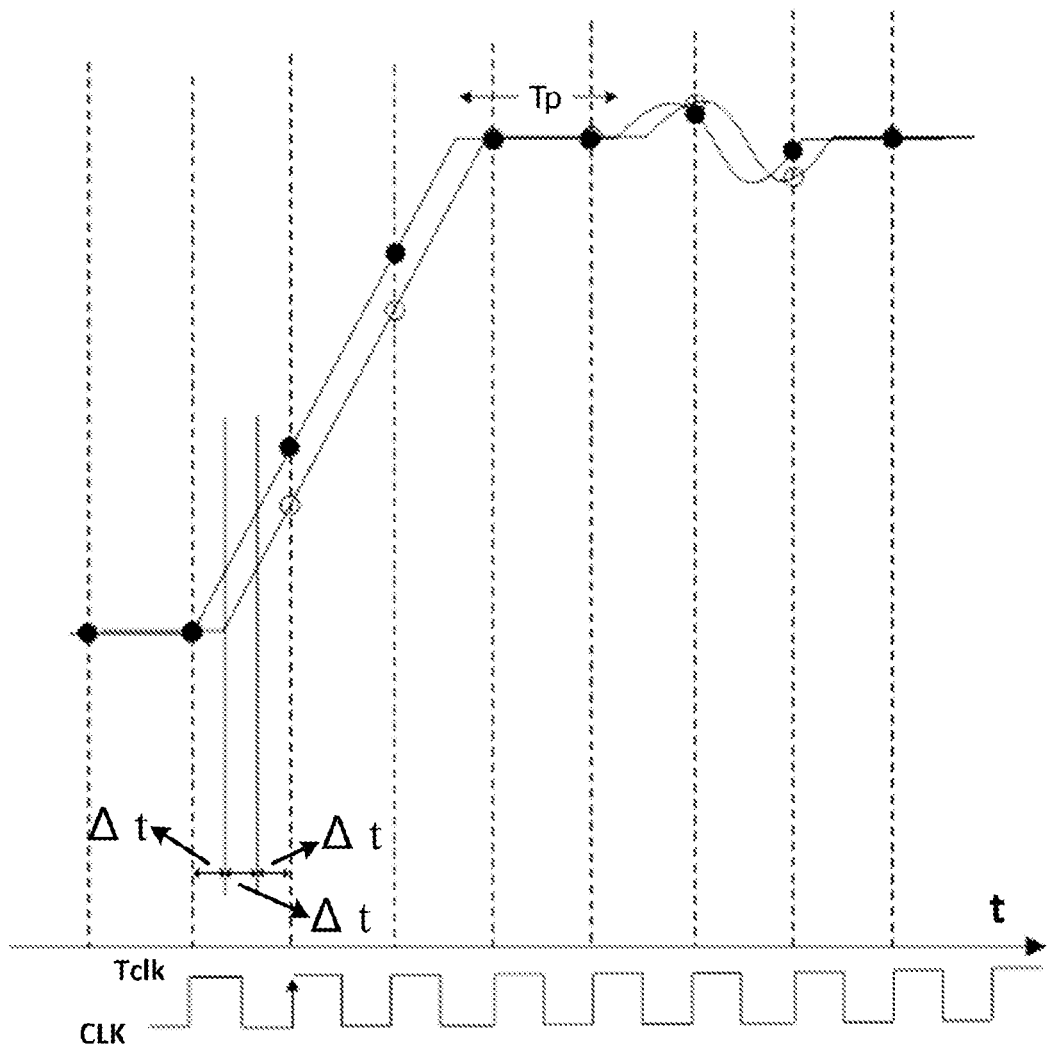
Figure 7:
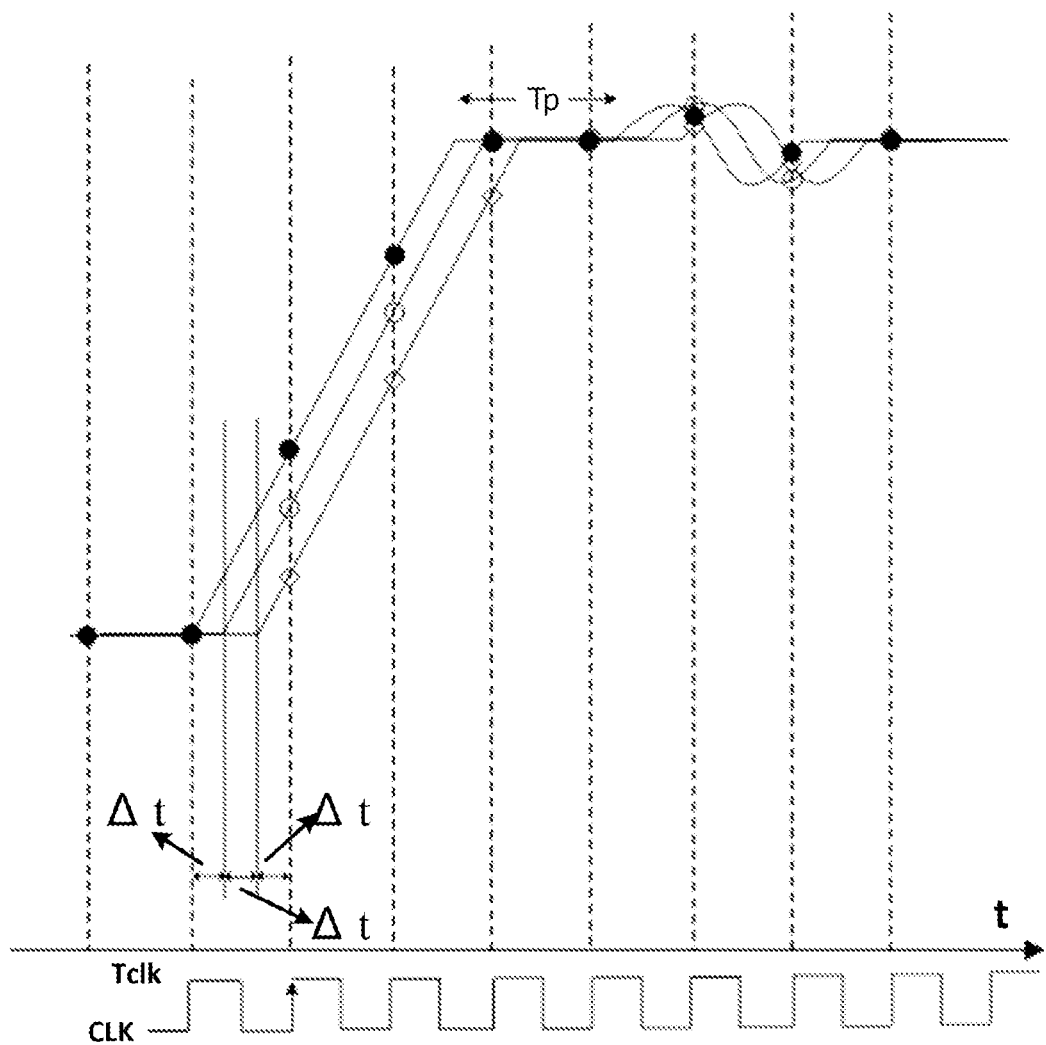

Exemplarily, FIGS. 5 to 8 are waveform diagrams of the delay sampling of an electrical signal sampling device according to an embodiment of the present application. It is to be noted that Tp in the figures denotes the duration of each sampling, that is, the time of multiple sampling points in each sampling. CLK denotes a sampling clock signal. Tclk denotes the period of the sampling clock signal. Referring to FIGS. 5 to 8, in this embodiment, it is assumed that t denotes one period of the pulse signal, that $\Delta t_0$ denotes the minimum step of a delay that the delay circuit can implement, and $\Delta t$ denotes the actual delay time of the delay circuit. Moreover, $\Delta t > \Delta t_0$. In the case where the sampling clock signal and the pulse signal are synchronized, the electrical signal sampling device 100 samples the pulse signal, input to the first sampling module 130, for the first time according to the rising edge of the sampling clock signal. In this case, black solid sampling points of the pulse signal shown in FIG. 5 are sampled at the rising edge of the sampling clock signal. Then after the delay circuit delays the sampling clock signal by $\Delta t$, the electrical signal sampling device 100 continues to sample the pulse signal, input to the first sampling module 130, for the second time according to the rising edge of the sampling clock signal. In this case, black hollow sampling points of the pulse signal shown in FIG. 6 are sampled at the rising edge of the sampling clock signal. Then after the delay circuit delays the sampling clock signal by $2*\Delta t$, the electrical signal sampling device 100 samples the pulse signal, input to the first sampling module 130, for the third time according to the rising edge of the sampling clock signal. In this case, black diamond sampling points of the pulse signal shown in FIG. 7 are sampled at the rising edge of the sampling clock signal.

Figure 8:
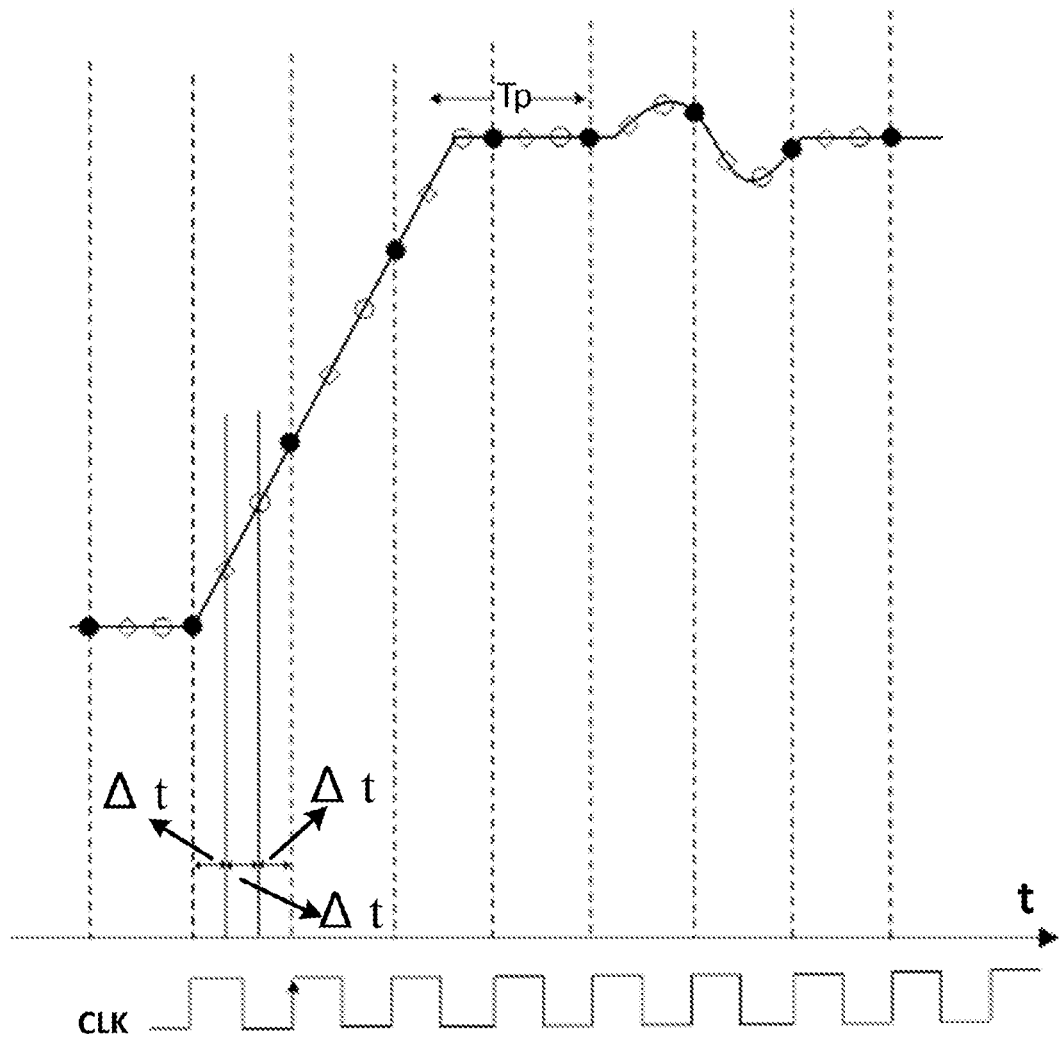

Above all, a sampled waveform has a fixed phase relationship with the sampling clock signal. Then sampling points sampled three times may be arranged in sequence according to the fixed phase relationship by using an algorithm so that the collected waveform collected at a high sampling rate shown in FIG. 8 is obtained. It can be seen that one original sampling period of the pulse signal is t and that the sampling rate is 1/t. In this case, through the preceding method of delaying the pulse signal, the sampling period changes from the original t into Δt (that is, 3*Δt=t). Correspondingly, the sampling rate changes to 3/t and is trebled. The time resolution, in this case, reaches Δt. Accordingly, the smaller the minimum delay step of the delay circuit 141, the higher the time resolution of the electrical signal sampling device 100. When a carry chain of a conventional FPGA is adopted, the time resolution may be increased to 10 ps.

Figure 9:
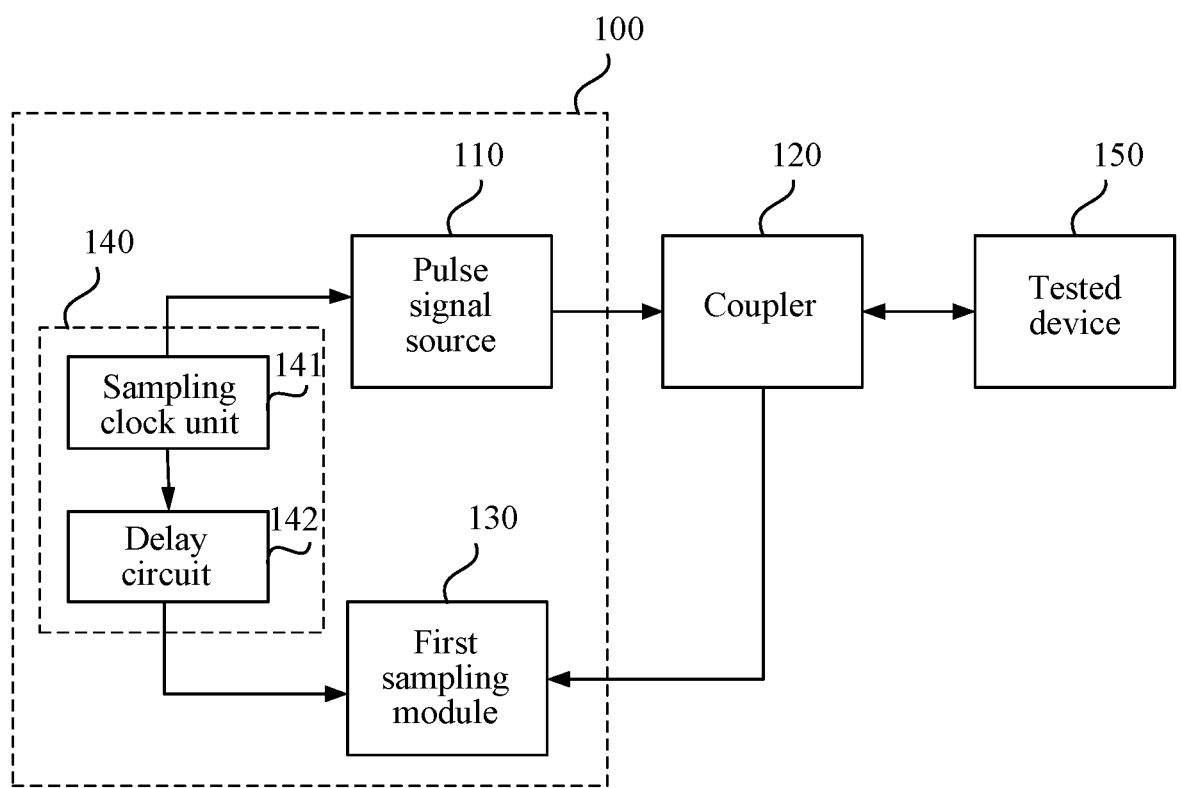
FIG. 9 is a structural diagram of another electrical signal sampling device according to an embodiment of the present application.

FIG. 9 is a structural diagram of another electrical signal sampling device according to an embodiment of the present application. Referring to FIG. 9, on the basis of the preceding embodiments, the pulse signal source 110 is connected to the sampling clock unit 142. The delay circuit 141 is connected to the sampling clock unit 142. The delay circuit 141 is connected to the first sampling module 130.

In this embodiment, the electrical signal sampling device 100 controls the first sampling module 130 to generate the N groups of sampling incidence signals in one period of the sampling incidence signal so as to improve the time resolution of TDR and TDT. The principle of this implementation is the same as the principle of controlling the pulse signal source to generate the N groups of pulse signals in one period of the pulse signal, which is not repeated here.

Exemplarily, for the first time, the sampling incidence signal is sampled once at the rising edge of the clock. For the second time, after the clock signal is delayed by Δt, the sampling incidence signal is sampled again by using the sampling clock signal. For the third time, after the clock signal is delayed by 2*Δt, the sampling incidence signal is sampled again by using the sampling clock signal. Because these three delays have a fixed and definite phase relationship, data sampled at these three times may be interleaved and spliced through an algorithm to obtain a waveform signal with a high sampling rate, thereby achieving an object of improving an equivalent sampling rate and improving the time resolution.

On the basis of the preceding embodiments, the delay circuit 141 may be one of a carry chain, an analog-to-digital conversion chip, a phase-locked loop, or a delay chip.

The delay circuit 141 adopts the delay adjustment function built in an analog-to-digital conversion chip whose minimum delay time is around at the fs level so that the time resolution is better improved by the analog-to-digital conversion chip.

On the basis of the preceding embodiments, the delay circuit 141 may also be implemented through one of a carry chain, a phase-locked loop, or a delay chip.

Figure 10:
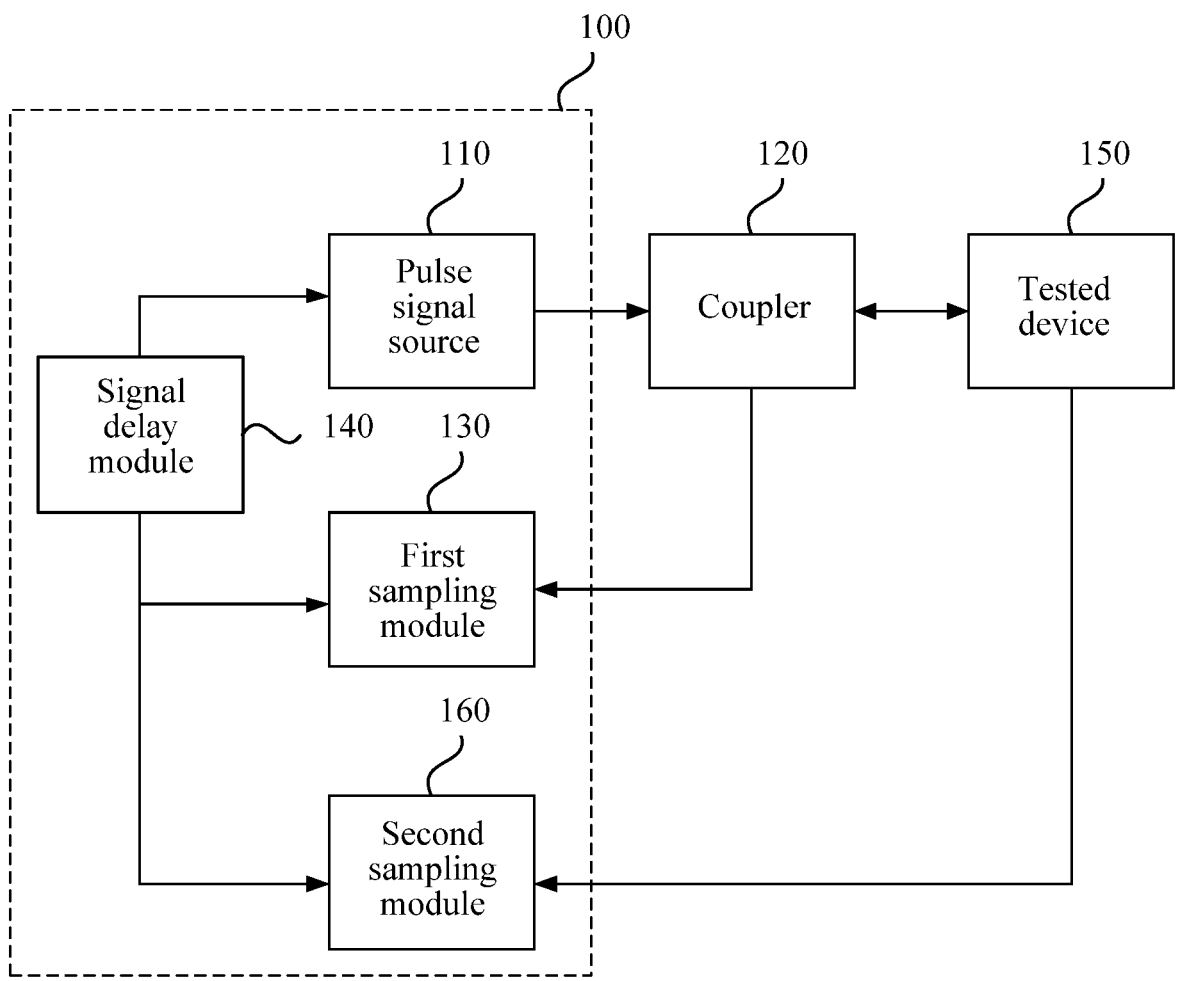
FIG. 10 is a structural diagram of another electrical signal sampling device according to an embodiment of the present application.

FIG. 10 is a structural diagram of an electrical signal sampling device according to an embodiment of the present application. Referring to FIG. 10, on the basis of the preceding embodiments, the electrical signal sampling device 100 further includes a second sampling module 160.

The second sampling module 160 is connected to a signal output end of the tested device 150 and is configured to collect a second test output signal of the tested device 150 and output a second sampling signal.

The second sampling module 160 is an analog signal sampling channel of the electrical signal sampling device 100. The second sampling module 160 is configured to collect the second test output signal of the tested device 150. After the tested device 150 receives the test input signal, the tested device 150 outputs the second test output signal directly.

The second sampling signal is a signal obtained after the second sampling module 160 samples the second test output signal.

It is to be understood that for the electrical signal sampling device 100 shown in FIG. 1, the coupler 120 is placed outside the electrical signal sampling device 100. The case where the electrical signal sampling device 100 further includes the second sampling module 160 as disclosed in this embodiment of the present application is also applicable to the case shown in FIG. 2 in which the coupler 120 is placed inside the electrical signal sampling device 100, which is not repeated in this embodiment of the present application.

On the basis of the preceding embodiments, with continued reference to FIGS. 3 and 10 each of which illustrates a structural diagram of the electrical signal sampling device, when the electrical signal sampling device is integrated with the TDT function, that is, when the electrical signal sampling device includes the second sampling module 160, the shown second sampling module 160 is connected to the tested device 150 and the signal delay module 140 separately.

Correspondingly, the signal delay module 140 includes the sampling clock unit and the delay circuit. On the basis of the preceding embodiments, the pulse signal source is connected to the delay circuit. The delay circuit is connected to the sampling clock unit. The sampling clock unit is connected to the second sampling module. In this case, corresponding to that the N excitation signals are used for controlling the pulse signal source to generate the N groups of pulse signals in one period of the pulse signal, the sampling clock unit is configured to provide a clock source for the pulse signal source 110 of the electrical signal sampling device 100 and the second sampling module 160 of the electrical signal sampling device 100; that is, the sampling clock unit is configured to generate the sampling clock signal. Moreover, the sampling clock unit guarantees that the pulse signal source 110 and the second sampling module 160 have a fixed phase relationship or connection relationship so that the frequency and phase of the pulse signal generated by the pulse signal source 110 are synchronized with the frequency and phase of the sampling clock signal. The working principle of the delay circuit is described in the preceding embodiments, which is not repeated here.

On the basis of the preceding embodiments, the pulse signal source is connected to the sampling clock unit. The delay circuit is connected to the sampling clock unit. The delay circuit is connected to the second sampling module. In this case, corresponding to that the N excitation signals are used for controlling the second sampling module to generate N groups of second sampling signals in one period of the second test output signal, the principle of this implementation is the same as the principle in which the electrical signal sampling device 100 controls the first sampling module 130 to generate the N groups of sampling incidence signals in one period of the sampling incidence signal so as to improve the time resolution of TDR and TDT, which is not repeated here.

The electrical signal sampling device, integrated with the TDR/TDT function, provided in embodiments of the present application adopts an ingenious circuit structure. The effect of an equivalent sampling oscilloscope is implemented by controlling the delay of the pulse signal source or controlling the sampling clock, overcoming problems of a huge analog bandwidth of the oscilloscope and an ultra-high-speed edge signal. An equivalent sampling rate is improved so as to implement a larger system bandwidth, thereby easily achieving an object of improving the time resolution of TDR and TDT.

What is claimed is:

1. An electrical signal sampling device, comprising:
a pulse signal source configured to generate a pulse signal;
a first sampling circuit, wherein the first sampling circuit is connected to the pulse signal source through a coupler, wherein the coupler is configured to fan-out the pulse signal to generate a test input signal and a sampling incidence signal, the test input signal is input into a tested device from the coupler and is coupled to form a test output signal, the test output signal is transmitted from the tested device to the coupler, and the first sampling circuit is configured to collect the sampling incidence signal and the test output signal through the coupler, wherein the first sampling circuit is an analog signal sampling channel of the electrical signal sampling device; and
a signal delay circuit, wherein the signal delay circuit is configured to generate N excitation signals through a preset delay; and the N excitation signals are used for controlling the pulse signal source to generate N groups of pulse signals in one period of the pulse signal, or the N excitation signals are used for controlling the first sampling circuit to generate N groups of sampling incidence signal in one period of the sampling incidence signal, wherein N is an integer greater than 1,
wherein the signal delay circuit comprises a sampling clock circuit and a delay circuit, wherein
the sampling clock circuit is configured to generate a sampling clock signal; and
the delay circuit is configured to generate the N excitation signals from the sampling clock circuit through the preset delay.

2. The electrical signal sampling device according to claim 1, wherein the pulse signal source is connected to the delay circuit, the delay circuit is connected to the sampling clock circuit, and the sampling clock circuit is connected to the first sampling circuit.

3. The electrical signal sampling device according to claim 2, wherein the delay circuit is one of a carry chain, a delay chip, a delay unit of a field-programmable gate array (FPGA), or a phase shifter.

4. The electrical signal sampling device according to claim 1, wherein the pulse signal source is connected to the sampling clock circuit, the delay circuit is connected to the sampling clock circuit, and the delay circuit is connected to the first sampling circuit.

5. The electrical signal sampling device according to claim 4, wherein the delay circuit is one of a carry chain, an analog-to-digital conversion chip, a phase-locked loop, or a delay chip.

6. The electrical signal sampling device according to claim 1, further comprising a second sampling circuit,
wherein the second sampling circuit is connected to a signal output end of the tested device, and the second sampling circuit is configured to collect a second test output signal of the tested device and output a second sampling signal, wherein the second sampling circuit is an analog signal sampling channel of the electrical signal sampling device.

7. The electrical signal sampling device according to claim 6, wherein the pulse signal source is connected to the delay circuit, the delay circuit is connected to the sampling clock circuit, and the sampling clock circuit is connected to the second sampling circuit.

8. The electrical signal sampling device according to claim 6, wherein the pulse signal source is connected to the sampling clock circuit, the delay circuit is connected to the sampling clock circuit, and the delay circuit is connected to the second sampling circuit.

9. The electrical signal sampling device according to claim 1, wherein the electrical signal sampling device is a real-time oscilloscope.

* * * * *